(12) United States Patent
Bauknecht et al.

(10) Patent No.: US 7,244,208 B2
(45) Date of Patent: Jul. 17, 2007

(54) DRIVE TRAIN FOR A HYBRID VEHICLE

(75) Inventors: Gert Bauknecht, Friedrichshafen (DE); Reinhard Mertinkat, Mittelbiberach (DE); Axel Heitmann, Ingolstadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 124 days.

(21) Appl. No.: 10/947,883

(22) Filed: Sep. 23, 2004

(65) Prior Publication Data
US 2005/0079942 A1 Apr. 14, 2005

(30) Foreign Application Priority Data
Oct. 8, 2003 (DE) ................................ 103 46 640

(51) Int. Cl.
*F16H 3/72* (2006.01)

(52) U.S. Cl. .................... 475/5; 475/271; 475/275; 475/278; 475/284; 475/288; 475/311; 180/65.2; 180/65.4

(58) Field of Classification Search ..................... 475/5, 475/271, 275, 278, 284, 288, 311, 323; 477/3; 180/65.2, 65.4, 65.7
See application file for complete search history.

(56) References Cited

U.S. PATENT DOCUMENTS

| | | | |
|---|---|---|---|
| 6,258,001 B1 | 7/2001 | Wakuta et al. | |
| 6,428,444 B1 * | 8/2002 | Tabata | 477/3 |
| 6,705,416 B1 | 3/2004 | Glonner et al. | |
| 2002/0116099 A1 * | 8/2002 | Tabata et al. | 701/22 |
| 2003/0127262 A1 | 7/2003 | Noreikat et al. | |
| 2004/0211604 A1 * | 10/2004 | Heitmann et al. | 180/65.2 |

FOREIGN PATENT DOCUMENTS

| | | |
|---|---|---|
| DE | 31 50 611 A1 | 6/1983 |
| DE | 198 10 374 A1 | 9/1999 |
| DE | 199 17 665 A1 | 10/2000 |
| DE | 101 40 424 A1 | 2/2003 |
| DE | 101 60 466 C1 | 8/2003 |
| WO | WO-01/07280 A1 | 2/2001 |
| WO | WO 3016749 A1 * | 2/2003 |

OTHER PUBLICATIONS

English translation of Tenberger, Prof. Dr. P., "E-Automat Automatikgetriebe mit Esprit", VDI-Berichte, Nr. 1610, Jun. 20, 2001, pp. 455-479.*
Tenberge, Prof. Dr. P., "E-Automat Automatikgetriebe mit Esprit", VDI-Berichte, Nr. 1610, Jun. 20, 2001, pp. 455-479.

* cited by examiner

*Primary Examiner*—David D. Le
(74) *Attorney, Agent, or Firm*—Davis Bujold & Daniels, P.L.L.C.

(57) ABSTRACT

A drive train (1, 30) for a hybrid vehicle, in which an internal combustion engine (2) is drive-technologically connected to a disengagement clutch (4) whose output side is connected to a transmission input shaft (7), which is connected to an input element (8, 38) of an automatic transmission (17, 36), and in which the transmission input shaft (7) can be driven by an electric machine (5) and itself drives a hydraulic pump (6), which is drive-technologically arranged after the disengagement clutch (4) and before a shiftable starting element (F) of the automatic transmission (17, 36).

20 Claims, 2 Drawing Sheets

DRIVE TRAIN FOR A HYBRID VEHICLE

This application claims priority from German Application Serial No. 103 46 640.1 filed Oct. 8, 2003.

FIELD OF THE INVENTION

The invention concerns a drive train for a hybrid vehicle.

BACKGROUND OF THE INVENTION

It is generally known to operate motor vehicles with an internal combustion engine and a transmission in so-termed start-stop operation, in which the internal combustion engine, perhaps during a prolonged stop at a traffic light, is turned off and started up again, for example, by actuating the accelerator pedal.

If an automatic transmission is used in such a vehicle, the problem arises that when the internal combustion engine is turned off, the pressure in the hydraulic system of the transmission also falls to too low a level, since a hydraulic pump mechanically driven by the combustion engine can no longer maintain hydraulic pressure when the combustion engine has stopped.

As is known, however, in automatic transmissions a sufficiently high hydraulic pressure is needed, for example to actuate transmission shift elements such as clutches and/or brakes, with whose help transmission ratio changes in the transmission are carried out. Just as important, is to maintain a hydraulic pressure high enough to keep the switching valves in a hydraulic transmission control unit in their working position. The performance of rapid shifting operations and, in particular, prompt starting after turning on the combustion engine again, is therefore at least difficult without additional measures.

To solve this problem, it is known to power the hydraulic pump no longer mechanically by the combustion engine, but by means of a separate electric motor. This, however, has the disadvantage that such an electric motor takes up additional structural space and increases manufacturing costs.

It is also known to equip motor vehicles with so-termed hybrid drives, which can be constructed and operated in various ways. In this, however, an internal combustion engine is usually combined with an electric machine.

If the electric machine is built as a starter-generator, it can be used both as the starter for the combustion engine and as the drive machine for purely electric or combined electric and combustion engine operation.

In addition, such a hybrid drive offers the pleasing possibility of operating the electric machine as a generator during non-powered driving phases (for example when the vehicle is coasting), with the aid of which electrical energy is then generated and stored intermediately in a suitable storage device for later starting of the combustion engine and/or for electric drive operation. With such a hybrid drive train, start-stop operation of the vehicle is also possible.

In this context, a variable-speed automatic transmission for hybrid-drive vehicles is known from U.S. Pat. No. 6,258,001 B1, in which, starting from the crankshaft of an internal combustion engine, a rotary oscillation damper, an electric machine, a hydrodynamic torque converter, a hydraulic pump and a planetary gearset are arranged drive-technologically one after the other. With this automatic transmission, a motor vehicle can advantageously be operated by means of the combustion engine and/or by means of the electric machine.

In relation to the powering of the transmission's hydraulic pump, this makes it possible for the pump to be driven by the combustion engine and/or by the electric motor. However, it is a disadvantage that while the combustion engine is off, although the hydraulic pump can be driven by the electric motor, the crankshaft of the combustion engine and, when the converter bridging clutch is closed, also the turbine wheel of the hydrodynamic torque converter, are driven with it in an energy-wasting way.

Against this background, therefore, it is the purpose of the present invention to propose a hybrid drive train with an automatic transmission for a motor vehicle, in which a hydraulic pump can be driven even when the combustion engine is off without using an additional electric motor and with low energy input.

SUMMARY OF THE INVENTION

According to these, the invention concerns a drive train for a hybrid vehicle, in which an internal combustion engine is connected drive-technologically to a disengagement clutch whose output side is connected to a transmission input shaft. This transmission input shaft is connected to an input element of an automatic transmission and can be driven by an electric machine. Moreover, it is provided that the transmission input shaft drives a hydraulic pump, which is arranged drive-technologically behind the separation clutch and ahead of a shiftable starting element F of the automatic transmission.

Thanks to this structure, but above all due to the arrangement of the electric machine and the hydraulic pump between the disengagement clutch and the shiftable starting element of the automatic transmission, the hydraulic pump can be driven with low energy input by the electric machine even when the combustion engine is off, the disengagement clutch is open and the starting element is open. Thus, after the end of a stop phase of the internal combustion engine, at the beginning of the start phase, sufficient hydraulic pressure is available for the control of switching valves and for the operation of the actuators of the clutches and brakes of the automatic transmission. Furthermore, no special electric motor need be provided to power the hydraulic pump.

In this connection, in an advantageous embodiment of the invention, the hydraulic pump is arranged drive-technologically between the electric machine and the input element of the automatic transmission.

In a concrete example embodiment of the invention, the starting element F is formed as a transmission brake, although in another structure of the transmission a transmission clutch can also be used.

Moreover, it can be provided that the automatic transmission is formed as a variable-speed automatic transmission, preferably a planetary transmission, and the said input element is built as a planetary support to hold transmission planetary gears. However, the automatic transmission can also be made as a continuously variable transmission while still making use of the advantages provided by the invention.

Another further development of the hybrid drive train, according to the invention, provides that a rotary oscillation damper is arranged drive-technologically between the internal combustion engine and the disengagement clutch, with which rotational non-uniformities of the combustion engine's crankshaft can be prevented from reaching the remaining parts of the drive train.

In the hybrid drive train, according to the invention, in a preferred embodiment the electric machine is formed as a starter-generator. This makes it possible to use an asynchronous machine or a permanently energized synchronous machine.

As regards the starting element formed as a transmission brake F, it is considered advantageous for its rotary brake element to be connected to a solar gear wheel which meshes with the planetary gears of the planetary transmission.

Furthermore, in another embodiment of this planetary transmission, it is provided that transmission planetary gears mesh with an annular gear wheel in rotationally fixed connection with the input of a transmission clutch A and with the input of a transmission clutch B.

In addition, in this connection it is appropriate for the output of the transmission clutch A to be connected to a third transmission shaft whose external gear-teeth mesh with an intermediate gear wheel.

Furthermore, this planetary transmission mentioned as an example is constructed such that the output of the transmission clutch B is connected to a fourth transmission shaft whose external gear-teeth mesh with a drive output gear wheel of the automatic transmission, this drive output gear wheel also being in meshing engagement with the transmission output shaft and the intermediate gear wheel.

A further feature of this variable-speed automatic transmission is that the fourth transmission shaft is connected to a rotary brake element of a transmission brake C. In addition, the planetary gear wheel support of the planetary transmission is connected to the input of a transmission clutch E whose output is coupled with a second transmission shaft, on which the intermediate gear wheel and the drive output gear wheel are mounted and which is connected to the rotary brake element of a transmission brake D.

Furthermore, in this automatic transmission, it is provided that the second transmission shaft is surrounded by the third transmission shaft and the third transmission shaft by the fourth transmission shaft.

As already mentioned, the advantages of the drive train, according to the invention, can be enjoyed with any type of automatic transmission. Thus, a drive train according to the invention can also be constructed with a planetary transmission in which the transmission input shaft is connected to the input element of a transmission clutch E and to an annular gear wheel. Besides, in this planetary transmission a gear wheel is provided on the input side which is in meshing engagement with the aforesaid annular gear wheel and with a solar gear wheel, the latter being in rotationally fixed connection with the output of a starting element F.

In this planetary transmission, it is also provided that the gear wheel on the input side is mounted to rotate on a support which, for its part, is connected to the input elements of the transmission clutches A and B already mentioned in connection with the planetary transmission of the first example embodiment.

BRIEF DESCRIPTION OF THE DRAWINGS

The invention will now be described, by way of example, with reference to the accompanying drawings in which a description is given that illustrates two concrete example embodiments in which the automatic transmission is constructed as a planetary transmission.

DETAILED DESCRIPTION OF THE INVENTION

Figure 1:
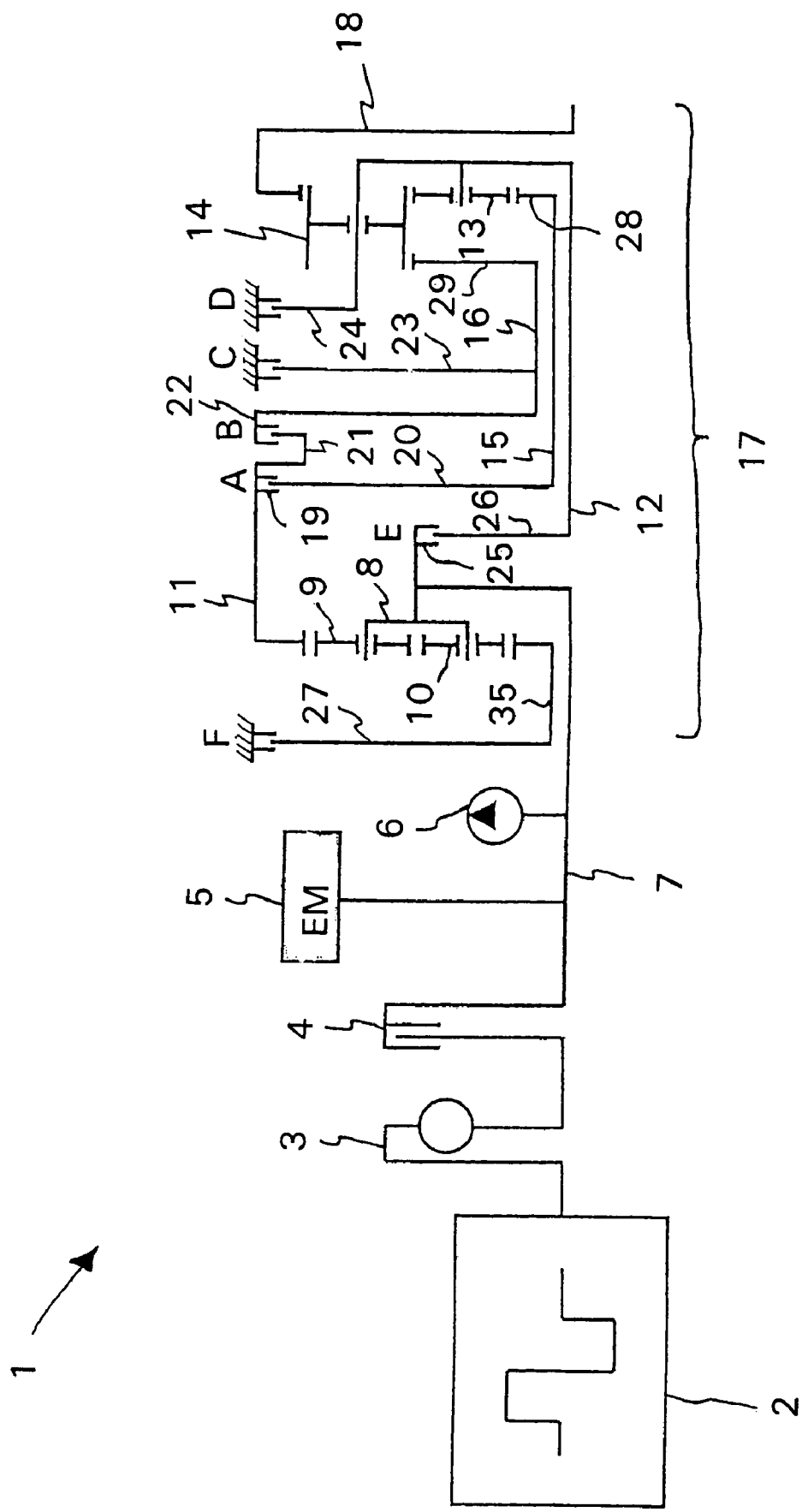
FIG. 1 is a schematic representation of a hybrid drive train for a motor vehicle, with a first planetary transmission variant.

For the drive train 1 of a hybrid vehicle shown in FIG. 1 the crankshaft of an internal combustion engine 2 is connected to a rotary oscillation damper 3, with the aid of which rotation non-uniformities of the combustion engine are damped and are thus not passed on to other components of the drive train 1 or only so to a harmless extent.

The output of this rotary oscillation damper 3 is connected to the input of a disengagement clutch 4, with which the remainder of the drive train 1 can be uncoupled from the internal combustion engine 2 and the rotary oscillation damper 3. This, for example, makes possible driving operation conditions in which the combustion engine 2 is turned off (flywheel-mass coasting phases), as known in their own right.

On the output side of the disengagement clutch 4 is drive-technologically connected a transmission input shaft 7, itself connected to an input element 8 of a planetary transmission 17. This transmission input shaft 7 can also be driven by an electric machine 5 which, in this example embodiment, is formed as a starter-generator. This structure enables for example an electric or combined electric-combustion engine drive and start-stop operation of a motor vehicle quipped with the drive train.

In addition, the transmission input shaft 7 can also power a hydraulic pump 6 which is in this case arranged directly after the electric machine 5 and before an input element 8 of the planetary transmission 17. Thanks to this structure the hydraulic pump 6 can be driven in any case, regardless of whether the drive train 1 is powered by the electric motor or by the internal combustion engine.

Furthermore, the hydraulic pump 6 can produce the control and/or actuation pressure needed for the actuators of the transmission shift elements, even when the combustion engine 2 is turned off and the vehicle is at rest. In this case, the electric machine 5 powers the hydraulic pump 6 while the disengagement clutch 4 and the starting element F are open.

The above-mentioned input element of the planetary transmission 17 in this case takes the form of a planetary gear support 8 on which planetary gear wheels 9, 10 are mounted, these meshing with the inner teeth of an annular gear wheel 11. Moreover, the planetary gear wheels mesh with a solar gear wheel 35 which is connected to the brake element 27 of the starting element F of the planetary transmission 17 constructed as a transmission brake.

In addition, the annular gear wheel 11 is connected to the input side 19 of a transmission clutch A and to the input side 21 of a transmission clutch B, actuation of which in co-operation with the further shift elements C, D and E can produce various transmission ratio steps of the automatic transmission 17.

It should be noted in this connection that the output side 20 of the transmission clutch A is connected to a third transmission shaft 15, whose external teeth 28 mesh with an intermediate gear wheel 13.

The output side 22 of the transmission clutch B, in contrast, as well as the rotary brake element 23 of the transmission brake 23, are connected to a fourth transmission shaft 16 whose external teeth 29, as well as the teeth of the intermediate gear wheel 13, mesh with a drive output gear 14.

Besides, it is also worth mentioning that the second transmission shaft 12, the third transmission shaft 15 and the fourth transmission shaft 16 are arranged coaxially with one another.

In addition, the planetary gear support 8 is connected to the input side 25 of a transmission clutch E, whose output side is connected to a second transmission shaft 12. This second transmission shaft 12 is made as a central shaft, which is enclosed coaxially by the other two transmission shafts 15, 16 made as hollow shafts.

Further at the end of the second transmission shaft 12 away from the transmission clutch E are mounted the aforesaid intermediate gear wheel 13 and the drive output gear wheel 14. In addition, the brake element 24 of the transmission brake D is attached to this shaft 12.

Finally the planetary transmission 17 has a transmission output shaft 18 whose inner teeth mesh with the outer teeth of the drive output gear wheel 14.

Figure 2:
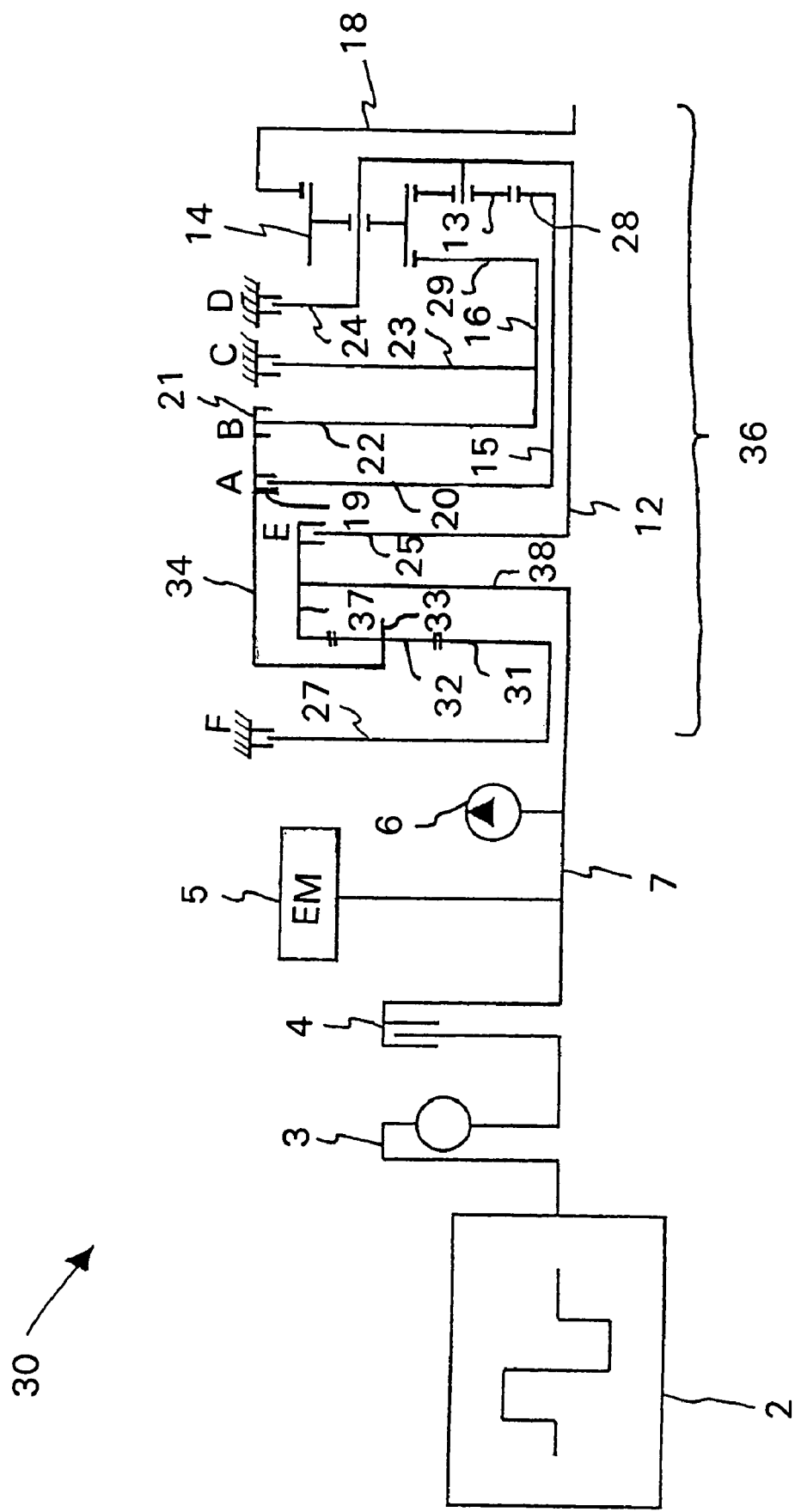
FIG. 2 is a representation such as that of FIG. 1, but showing a second planetary transmission variant.

FIG. 2 shows a drive train 30 which is constructed largely in the same way as the drive train 1 of FIG. 1. In the planetary transmission 36, shown in this case, however, the difference is that the transmission input shaft 7 is connected to the input element 38 which, for its part, is connected to the input side of the transmission clutch E and to an annular gear wheel 37. This annular gear wheel 37 is with a gear wheel 32, which also meshes with a solar gear wheel 31. The solar gear wheel 31, for its part, is in rotationally fixed connected with the brake element 27 of the starting element F.

Finally, it can clearly be seen from FIG. 2 that the gear wheel 32 is mounted to rotate on a support 33, which is connected to an annular gear wheel 34. This annual gear wheel 34 also carries the input elements 19, 21 of the transmission clutches A and B, whose output elements 20, 22 cooperate with the other components of the planetary transmission 36 already known from FIG. 1.

REFERENCE NUMERALS

1 Drive train
2 Internal combustion engine
3 Rotary oscillation damper
4 Disengagement clutch
5 Electric machine
6 Hydraulic pump
7 Transmission input shaft
8 Input element, planetary gear wheel support
9 Planetary gear wheel
10 Planetary gear wheel
11 Solar gear wheel
12 Second transmission shaft
13 Intermediate gear wheel
14 Drive output gear wheel
15 Third transmission shaft
16 Fourth transmission shaft
17 Planetary transmission, automatic transmission, variable-speed automatic transmission
18 Transmission output shaft
19 Input, clutch A
20 Output, clutch A
21 Input, clutch B
22 Output, clutch B
23 Brake element, brake C
24 Brake element, brake D
25 Input, clutch E
26 Output, clutch E
27 Brake element of starter element F
28 External teeth of the third transmission shaft
29 External teeth of the fourth transmission shaft
30 Drive train
31 Solar gear wheel
32 Gear wheel
33 Support for gear wheel 32
34 Annular gear wheel
35 Solar gear wheel
36 Planetary transmission
37 Annular gear wheel
38 Input element
A Transmission clutch
B Transmission clutch
C Transmission brake
D Transmission brake
E Transmission clutch
F Starting element, transmission brake.

The invention claimed is:

1. A drive train (1, 30) for a hybrid vehicle, the drive train having an internal combustion engine (2) connected to an input side of a disengagement clutch (4), an output side of the disengagement clutch (4) being permanently connected to a first end of a continuous transmission input shaft (7), a second end of the continuous transmission input shaft being permanently connected to an input element (8, 38) of an automatic transmission (17, 36), an electric machine (5) being connected to the continuous transmission input shaft (7) for driving the continuous transmission input shaft (7), a hydraulic pump (6) being arranged down stream of the disengagement clutch (4) and before a shiftable starting element (F) of the automatic transmission (17, 36) and driven by the continuous transmission input shaft, so that when the disengagement clutch (4) and the starting element (F) are both disengaged and the electric machine (5) is operating, only the continuous transmission input shaft (7), the input element (8, 38) of the automatic transmission (17, 36) and the hydraulic pump (6) are driven by the electric machine (5).

2. The drive train according to claim 1, wherein the hydraulic pump (6) is arranged drive-technologically between the electric machine (5) and the input element (8, 38) of the automatic transmission (17, 36).

3. The drive train according to claim 1, wherein the starting element (F) is one of a transmission brake and a transmission clutch.

4. The drive train according claim 1, wherein the automatic transmission (17, 36) is one of a variable-speed automatic transmission and a continuously variable automatic transmission.

5. The drive train according to claim 1, wherein the input element of the automatic transmission (17) is a planetary gear support (8) which supports planetary gear wheels (9, 10).

6. The drive train according claim 1, wherein a rotary oscillation damper (3) is arranged drive-technologically between the internal combustion engine (2) and the disengagement clutch (4).

7. The drive train according to claim 1, wherein the electric machine (5) is a starter-generator.

8. The drive train according to claim 7, wherein the electric machine (5) is one of an asynchronous machine and a permanently enerqized synchronous machine.

9. The drive train according to claim 1, wherein starting gears (9) of a planetary transmission (17) mesh with an annular gear wheel (11), the annular gear wheel being rotationally fixed connected with an input (19) of a second transmission clutch (A) and with an input (21) of a third transmission clutch (B).

10. The drive train according to claim 1, wherein an output (20) of a second transmission clutch (A) is connected to a third transmission shaft (15), whose external teeth (28) mesh with an intermediate gear wheel (13).

11. The drive train according to claim 1, wherein an output (22) of a third transmission clutch (B) is connected to a fourth transmission shaft (16), whose external teeth (29) mesh with a drive output gear (14) which meshes with a transmission output shaft (18).

12. The drive train according to claim 1, wherein a fourth transmission shaft (16) is connected to a brake element (23) of a transmission brake (C).

13. The drive train according to claim 1, wherein the input element (8, 38) is connected to an input (25) of a fourth transmission clutch (E).

14. The drive train according to claim 1, wherein an output (26) of a fourth transmission clutch (E) is connected to a second transmission shaft (12), on which are mounted an intermediate gear wheel (13) and a drive output gear (14) and the output (26) is connected to a rotary brake element (24) of a transmission brake (D).

15. The drive train according to claim 1, wherein a second transmission shaft (12) is coaxially surrounded by a third transmission shaft (15) and the third transmission shaft (15) is coaxially surrounded by a fourth transmission shaft (16).

16. The drive train according to claim 1, wherein the input element (38) is connected to an input side of a fourth transmission clutch (E) and to an annular gear wheel (37).

17. The drive train according to claim 16, wherein a gear wheel (32) meshes with the annular gear wheel (37) and with a sun gear wheel (31), and the sun gear wheel (31) in rotationally fixed connected with an output (27) of the starting element (F).

18. The drive train according to claim 16, wherein a gear wheel (32) is mounted to rotate on a support (33) which is connected to input elements (19, 21) of two transmission clutches (A and B).

19. A drive train (1, 30) for a hybrid vehicle, the drive train having an internal combustion engine (2) connected to an input side of a disengagement clutch (4), an output side of the disengagement clutch (4) being permanently connected to a first end of a continuous transmission input shaft (7), a second end of the continuous transmission input shaft (7) being permanently connected to an input element (8, 38) of an automatic transmission (17, 36), an electric machine (5) being connected to the continuous transmission input shaft (7) for driving the continuous transmission input shaft (7), a hydraulic pump (6) being arranged drive-technologically after the disengagement clutch (4) and before a shiftable starting element (F) of the automatic transmission (17, 36) and driven by the continuous transmission input shaft, so that when the disengagement clutch (4) and the shiftable starting element (F) are both disengaged and the electric machine (5) is operating, only the continuous transmission input shaft (7), the input element (8, 38) of the automatic transmission (17, 36) and the hydraulic pump (6) are driven by the electric machine (5); and the shiftable starting element is a transmission brake (F) and has a brake element (27) connected to a sun gear wheel (35) which meshes with planetary gears (10) of the automatic transmission (17).

20. A hybrid vehicle drive train (1, 30) having an internal combustion engine (2) connected to an input side of a disengagement clutch (4) via an oscillation damper and an output side of the disengagement clutch (4) being directly connected to a first end of a transmission input shaft (7) which is directly connected to an input element (8, 38) of an automatic transmission (17, 36), an electric machine (5) is coupled to the transmission input shaft (7) for at least one of the driving and being driven by the transmission input shaft (7), and a hydraulic pump (6) being arranged after the disengagement clutch (4) but before a shiftable starting element (F) of the automatic transmission (17, 36) and driven by the transmission input shaft, so that when the disengagement clutch (4) and the starting element (F) are disengaged and the electric machine (5) is operated, only the transmission input shaft (7), the input element (8, 38) of the automatic transmission (17, 36) and the hydraulic pump (6) are driven by the electric machine (5) without any other automatic transmission element being driven by the electric machine (5).

* * * * *